United States Patent
Lloyd et al.

(10) Patent No.: US 8,126,830 B2
(45) Date of Patent: Feb. 28, 2012

(54) METHOD FOR ENSURING PRIVACY WHILE QUERYING A DATABASE BY USING QUANTUM SUPERPOSITION AND MULTIPLE RESPONSES

(76) Inventors: Seth Lloyd, Wellesley, MA (US); Vittorio Giovannetti, Pisa (IT); Lorenzo Maccone, Ivrea (IT)

(*) Notice: Subject to any disclaimer, the term of this patent is extended or adjusted under 35 U.S.C. 154(b) by 918 days.

(21) Appl. No.: 12/145,050

(22) Filed: Jun. 24, 2008

(65) Prior Publication Data
US 2009/0012938 A1    Jan. 8, 2009

Related U.S. Application Data

(60) Provisional application No. 60/947,720, filed on Jul. 3, 2007.

(51) Int. Cl.
*G06F 17/00* (2006.01)
(52) U.S. Cl. .......................... 706/45; 707/705
(58) Field of Classification Search ........... 706/45–48, 706/52, 62; 707/609, 694, 705–707, 736
See application file for complete search history.

(56) References Cited

U.S. PATENT DOCUMENTS

| | | | |
|---|---|---|---|
| 7,334,008 B2* | 2/2008 | Branciforte et al. | 708/200 |
| 2002/0152191 A1* | 10/2002 | Hollenberg et al. | 707/1 |
| 2003/0149511 A1* | 8/2003 | Rizzotto et al. | 700/262 |
| 2004/0078421 A1 | 4/2004 | Routt et al. | |
| 2005/0259825 A1 | 11/2005 | Trifonov et al. | |
| 2006/0101236 A1* | 5/2006 | Han | 712/34 |
| 2006/0224547 A1* | 10/2006 | Ulyanov et al. | 706/62 |
| 2007/0087756 A1 | 4/2007 | Hoffberg et al. | |
| 2009/0164435 A1* | 6/2009 | Routt | 707/3 |

* cited by examiner

*Primary Examiner* — David Vincent
(74) *Attorney, Agent, or Firm* — Law Offices of Paul E. Kudirka

(57) ABSTRACT

In a database query operation, a quantum private query (QPQ) protocol allows a user to determine whether the database provider has been trying to obtain information about their query by performing quantum superpositions of different queries in addition to performing normal queries. This means that, in addition to being able to request the jth or the kth records in the database, the user can also request both records in a quantum superposition. To find out whether the database provider is trying to discover her queries, the user sends proper superpositions of queries and then checks the answer provided by the database to determine whether the superposition has been preserved. If superposition has not been preserved, the user can be confident that the database provider has cheated, and has tried to obtain information on the query.

17 Claims, 2 Drawing Sheets

METHOD FOR ENSURING PRIVACY WHILE QUERYING A DATABASE BY USING QUANTUM SUPERPOSITION AND MULTIPLE RESPONSES

BACKGROUND

This invention relates to quantum cryptography, and more particularly to apparatus and methods for encoding information in physical carriers to allow a first party to interrogate a database in possession of a second party in such a way that the first party can access only a limited part of the database, and the second party cannot discover which information was accessed.

Privacy is a major concern in many information transactions. A familiar example is provided by the transactions between web search engines and their users. In a typical transaction, a user (called "Alice" in the discussion below) accesses data held in a database controlled by a provider (called "Bob" in the discussion below). On one hand, Alice would typically prefer not to reveal to Bob the item in which she is interested (a "user privacy" problem). On the other hand, Bob owner would like not to disclose more information than that Alice has asked for (a "data privacy" problem). Typically, user privacy and data privacy are in conflict. The most straightforward way to obtain user privacy is for Alice to have Bob send her the entire database contents, leading to no data privacy whatsoever. Conversely, techniques for guaranteeing data privacy typically leave the user vulnerable (see for example, Y. Gertner, Y. Ishai, E. Kushilevitz, and T. Malkin, *Journal of Computer Systems Sciences*, 60:592, 2000).

At an information theory level, this problem has been formalized by Gertner et al., as the Symmetrical Private Information Retrieval (SPIR) problem (Y. Gertner, Y. Ishai, E. Kushilevitz, and T. Malkin. *Journal of Computer Systems Sciences*, 60:592, 2000). This work is a generalization of the Private Information Retrieval (PIR) problem, which deals with user privacy alone. Private Information Retrieval has a large body of work devoted to it. Examples are disclosed in U.S. Pat. Nos. 5,855,018; 6,167,392; 6,438,554; 7,013,295 and 7,231,047. Other articles on the subject include "Private Retrieval of Digital Objects", B. Chor, O. Goldreich, E. Kushilevitz, and M. Sudan, *Journal of the ACM*, 45:965, 1998; C. Cachin, S. Micali, and M. Stadler. in *Advances in Cryptology*—EUROCRYPT99, 1999; C. Gentry and Z. Ramzan in *Proc.* 32*nd ICALP*, pages 803-815, 2005; S. Yekhanin, *Technical Report ECCC TR*06-127, 2006; E. Kushilevitz and R. Ostrovsky in *Proc.* 38*th IEEE Symposium FOCS*97, page 364, 1997).

Symmetrical Private Information Retrieval is closely related (G. Di Crescenzo, T. Malkin, and R. Ostrovsky in *LNCS*, 1807:122-138, 2000) to oblivious transfer. In an oblivious transfer, Bob sends to Alice N bits, out of which Alice can access exactly one bit-which one bit, Bob doesn't know (S. Wiesner, *ACM SIGACT News*, 15:78, 1983; M. O. Rabin. *Technical Report TR*-81, Harvard Aiken Computational Laboratory, 1981; A. Jakoby, M. Liskiewicz, and A. Madry, *arXiv: quant-ph*/0605150, 2006; G. Brassard, C. Cr'epeau, and J. M. Robert in *Advances in Cryptology-Crypto*86, page 234, 1987).

One problem with conventional cryptographic protocols is that they all require some assumption on the computational or technological power of eavesdropper. A sufficiently powerful eavesdropper can always intercept the information exchanged by distant parties by attacking some stage of the protocol. In any case, SPIR ensures data privacy only in the case of honest users (an honest user is defined as one who does not want to compromise her chances of getting the information about the selected item in order to get more). Quantum cryptography permits a wealth of algorithms where security is enforced by physical laws (unconditional security). No matter how powerful an eventual eavesdropper is, he cannot discover the information that the legitimate parties are exchanging. Quantum cryptographic protocols are disclosed in U.S. Pat. Nos. 5,307,410; 5,243,649; 5,850,441 and 6,678, 379, 2004 and in an article entitled "Quantum key distribution method and apparatus", C. H. Bennett and G. Brassard, *Proc. IEEE Int. Conf. on Computers, Systems and Signal Processing*, Bangalore, India, pages 175-179, 2003.

However, no efficient solutions in terms of both communication and computational complexity are known for SPIR (A. Ambainis in *Proceedings of the* 24*th ICALP*, Lecture Notes in Computer Science, 1256:401, 1997). Indeed, even rephrasing the known solutions at a quantum level, the best known solution for the SPIR problem (with a single database server) requires O(N) qubits to be exchanged between the server and the user, where N is the number of items contained in the database (I. Kerenidis and R. de Wolf, *arXiv: quant-ph*/0208062, 2002; I. Kerenidis and R. de Wolf, *arXiv: quant-ph*/0307076, 2003).

Slightly better performances can be obtained by assuming the existence of multiple non-mutually communicating replicas of the servers, see Refs. (B. Chor, O. Goldreich, E. Kushilevitz, and M. Sudan, *Journal of the ACM*, 45:965, 1998; C. Cachin, S. Micali, and M. Stadler, in *Advances in Cryptology-EUROCRYPT*99, 1999; C. Gentry and Z. Ramzan in *Proc.* 32*nd ICALP*, pages 803-815, 2005; S. Yekhanin. *Technical Report ECCC TR*06-127, 2006). Moreover sublinear communication complexity can be achieved under the some computational complexity assumption, e.g. (E. Kushilevitz and R. Ostrovsky, in *Proc.* 38*th IEEE Symposium FOCS*97, page 364, 1997). Nevertheless, no conventional single server PIR or SPIR solutions have a communication complexity or computational complexity substantially less than O(N) (B. Chor, O. Goldreich, E. Kushilevitz, and M. Sudan, *Journal of the ACM*, 45:965, 1998; C. Cachin, S. Micali, and M. Stadler in *Advances in Cryptology—EUROCRYPT*99, 1999; C. Gentry and Z. Ramzan in *Proc.* 32*nd ICALP*, pages 803-815, 2005; S. Yekhanin, *Technical Report ECCC TR*06-127, 2006; E. Kushilevitz and R. Ostrovsky in *Proc.* 38*th IEEE Symposium FOCS*97, page 364, 1997).

SUMMARY

In accordance with the principles of the invention, rather than insuring complete user privacy and data privacy, a quantum private query (QPQ) protocol ensures complete data privacy and allows a user to determine whether the database provider has been trying to obtain information about their query. In accordance with the QPQ protocol, during a database access, quantum superpositions of different queries are performed in addition to performing normal queries. This means that, in addition to being able to request the jth or the kth records in the database, the user can also request both records in a quantum superposition. To find out whether the database provider is trying to discover her queries, the user sends proper superpositions of queries and then checks the answer provided by the database to determine whether the superposition has been preserved. If superposition has not been preserved, the user can be confident that the database provider has cheated, and has tried to obtain information on the query because any capture of information by the database provider would have induced a disturbance. With respect to (classical or quantum) SPIR and oblivious transfer protocols, QPQ presents an exponential reduction in communication complexity.

In one embodiment, the quantum superposition comprises a fixed superposition of an actual query and a fixed reference query.

In another embodiment, the quantum superposition comprises an arbitrary superposition of an actual query and a fixed reference query.

In still another embodiment, the quantum superposition comprises a superposition of an actual query and a random query.

In yet another embodiment which does not require that the provider possess a quantum memory, the user prepares the state superpositions necessary to interrogate the database.

DETAILED DESCRIPTION

Figure 1:
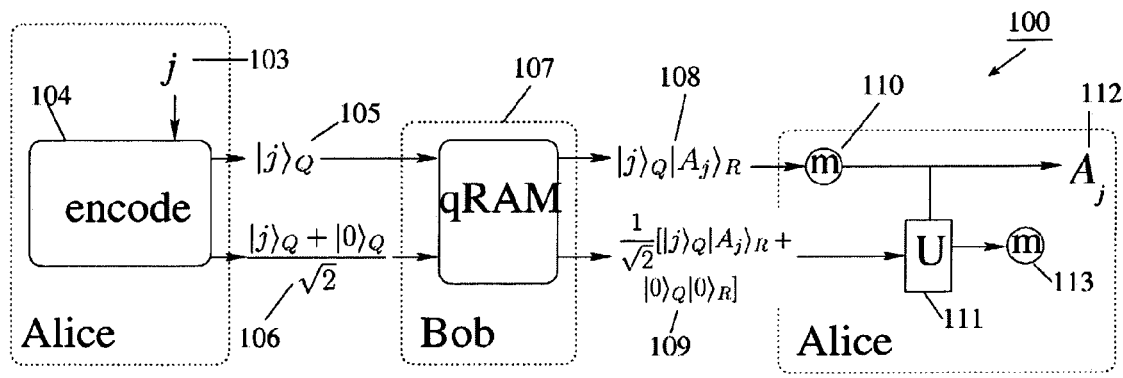
FIG. 1 is a schematic block diagram of a first embodiment of the QPQ protocol 100 which utilizes a superposition of a query with a fixed reference query.

The first embodiment of the QPQ protocol shown in FIG. 1 is based on Alice sending superpositions of her query and a fixed reference query (called a "rhetoric query"). In this embodiment, to submit her query on the jth record of Bob's database, Alice uses an n qubit memory register Q. This register allows her to interrogate a database of up to $N=2^n$ elements. To test whether Bob is cheating and is trying to discover her query, she submits a superposition of queries. Using the encoder 104, she prepares two copies of the register Q. The first copy 105 is initialized as:

$$|j\rangle_Q \qquad (1)$$

and the second copy 106 is initialized as $(|j\rangle_Q+|0\rangle_Q)/\sqrt{2}$ (2)

In this embodiment it is assumed that 0th record in Bob's database contains a fixed reference value known to Alice (the "rhetoric query").

Alice then randomly chooses one of these two registers and sends it to Bob. He interrogates his database using it as an index register and employing a qRAM algorithm 107 such as that described below. The qRAM algorithm returns a second register R which contains the answer to the query, and which may be entangled with the register Q, if the query was in the superposition state (without loss of generality we can assume R to be a single qubit). Bob sends back to Alice the R register 108 or 109 and the Q register which he received.

Alice then sends Bob the second Q register, which, again, is employed by Bob to interrogate his database. Bob then sends the new Q register back to Alice together with a new R register containing the answer to her second query. It is important to stress that Bob never knows if the register he receives from Alice is the register 106 containing the quantum superposition or the other register 105 which does not contain a quantum superposition. This means Bob does not know which measurement could extract information on j without disturbing the register. The number of exchanged qubits is $2(n+1)=2(\log N+1)$ (of these only two qubits contain information on the database).

In attempting to obtain information about Alice's state, Bob must try to distinguish between two possible states that have an overlap $1/\sqrt{2}$. That is, Bob's position is isomorphic to that of "Eve" in conventional quantum cryptography, and any attempt on his part to gain information can be detected by Alice: the tradeoff between the information that Bob can obtain and his probability of being detected by Alice are essentially the same as in quantum cryptography (see, for example, M. Christandl and A. Winter, *IEEE Transactions on Information Theory*, 51:3159, 2005) as discussed below.

In particular, after the double exchange with Bob, Alice is in possession of the two states 108 and 109, that is:

$$|\psi_1\rangle = |j\rangle_Q|A_j\rangle_R \text{ and} \qquad (3)$$

$$|\psi_2\rangle = \frac{1}{\sqrt{2}}(|j\rangle_Q|A_j\rangle_R + |0\rangle_Q|A_0\rangle_R)$$

where $A_m$ is the content of the mth record in the database. Alice can recover the value of $A_j$ by a measurement 110 of $|\psi_1\rangle$. This value provides the answer 112 to her query, and can be used to construct a measurement 111 and 113 to test whether the second state is really of the form $|\psi_2\rangle$.

The measurement 111 and 113 yields two possible outcomes: the outcome "yes" if the received state is $|\psi_2\rangle$ and the outcome "no" if the received state is not $|\psi_2\rangle$. In mathematical terms, this measurement is described by a two-valued Positive Operator Valued measurement, such as that described in M. A. Nielsen and I. L. Chuang, *Quantum Computation and Quantum Information*, Cambridge University Press, Cambridge, 2000, which article is incorporated by reference in its entirety. Specifically, the POV measurement is composed by the projector on $|\psi_2\rangle$ and by the projector $1-|\psi_2\rangle\langle\psi_2|$ on the orthogonal subspace of $|\psi_2\rangle$. If Alice obtains a result connected to the second element, $1-|\psi_2\rangle\langle\psi_2|$, she can be certain that Bob has cheated. Therefore, this measurement is called the "honesty test" of Bob. If Bob is acquiring information on j, he will be perturbing the superposition state $|\psi_2\rangle$ and Alice has a nonzero probability of detecting this perturbation. This probability is not unity (that is, Bob can avoid detection if he is lucky), but no matter what he does, this probability will always be different from zero and Bob will be discovered cheating sooner or later. The only assumption necessary is that the value $A_j$ is uniquely determined by j, that is, that there cannot be two different answers to one query.

The simple protocol described above can be easily modified to increase its performance. First of all, in place of the fixed superposition $(|j\rangle_Q+|0\rangle_Q)/\sqrt{2}$, Alice can employ any arbitrary superposition $\alpha|j\rangle_Q+\beta|0\rangle_Q$ with complex amplitudes $\alpha$ and $\beta$ unknown to Bob. In this way Bob's ability of masking his actions is greatly reduced. Alternatively, Alice can submit her query by entangling the register Q with an ancillary system S she keeps with her while sending Q to Bob. In this case the input states given in equations (1) and (2) are replaced by the vectors:

$$|j\rangle_Q|1\rangle_S \qquad (4)$$

and $$(|j\rangle_Q|1\rangle_S+|0\rangle_Q|2\rangle_S)/\sqrt{2} \qquad (5)$$

with $|1\rangle_S$ and $|2\rangle_S$ being two orthogonal states of S. In this version of the protocol the vectors (4) and (5) describe, respectively, the state of the registers 105 and 106 of FIG. 1 and their (quantum) correlations with the auxiliary ancilla S.

This modified protocol proceeds as described above. Alice sends the two registers in random order waiting for Bob answer before sending the second one. The associated outcomes are in this case:

$$|\psi_1\rangle = |j\rangle_Q |1\rangle_S |A_j\rangle_R \text{ and} \quad (6)$$

$$|\psi_2\rangle = \frac{1}{\sqrt{2}}(|j\rangle_Q |1\rangle_S |A_j\rangle_R + |0\rangle_Q |2\rangle_S |A_0\rangle_R)$$

As in the previous case, Alice will use the vector $|\psi_1\rangle$ to recover the value of $A_j$ and the vector $|\psi_2\rangle$ to test whether or not Bob has cheated. This second stage can again be accomplished by performing a measurement that yields two possible outcomes: the outcome "yes" if the received state is $|\psi_2\rangle$ and the outcome "no" if the received state is not $|\psi_2\rangle$. The corresponding measure is now a two-valued joint Positive Operator Valued measurement which acts on the systems Q, S and R and which verifies whether or not the received state is the entangled state $|\psi_2\rangle$ (see M. A. Nielsen and I. L. Chuang, *Quantum Computation and Quantum Information*, Cambridge University Press, Cambridge, 2000).

Figure 2:
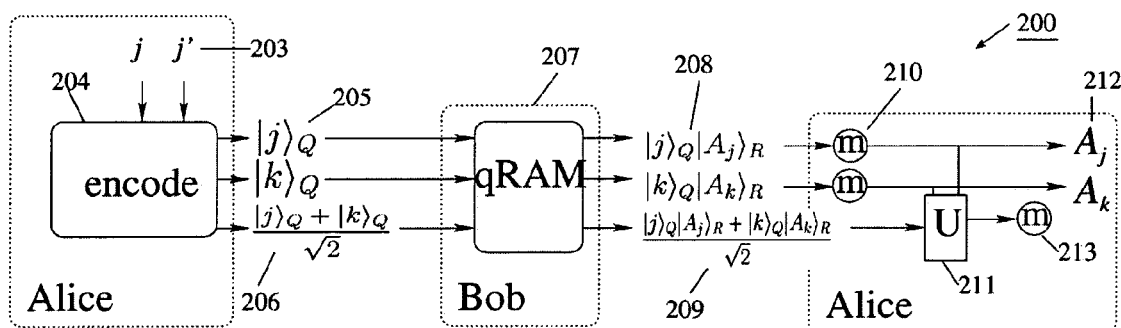
FIG. 2 is a schematic block diagram of the second embodiment of the QPQ protocol in which a superposition of two queries is used.

In a second embodiment shown in FIG. 2, instead of creating a superposition with the rhetoric query $|0\rangle_Q$, Alice superimposes two (or more) different queries, as detailed below. In this protocol variant 200, in addition to the query j in which Alice is interested, she randomly chooses another query 203 (say the k-th). Now she prepares three n-qubits registers 205 and 206 in the state:

$$|j\rangle_Q, |k\rangle_Q, \text{ and } (|j\rangle_Q + |k\rangle_Q)/\sqrt{2} \quad (7)$$

As in the embodiment discussed previously, Alice sends the registers to Bob in random order and one-by-one (that is, she waits for Bob's reply before submitting the next register). Bob employs the registers in the quantum RAM 207. At the end of their exchange, if Bob has not cheated, Alice is in possession of the three states 208 and 209:

$$|j\rangle_Q |A_j\rangle_R, |k\rangle_Q |A_k\rangle_R \text{ and } (|j\rangle_Q |A_j\rangle_R + |k\rangle_Q |A_k\rangle_R)/\sqrt{2} \quad (8)$$

Alice then measures state 208, i.e. the first two, in order to find out the values of $A_j$ and $A_k$: the former is the answer she was looking for 212, the latter will be used to prepare the measurement 211 and 213 (see above) to test the third state to check the superposition. If the test fails, she can conclude that Bob has cheated.

There are several different possible physical implementations for these two variants of the protocol, and they are dependent on the physical implementation of the underlying quantum logic. As an illustrative example, one of the most promising quantum technologies for quantum communication is quantum optics, where qubits are encoded into polarization degrees of freedom of photons. Alternatively, hybrid strategies can be considered where photons are used as information carriers in the communication lines and different technologies (such as quantum dots, NMR, trapped ions) are used for local quantum information processing at Alice and Bob's sites.

In contrast to the classical strategies where Alice hides her query among randomly chosen ones, the security of the QPQ does not rest on the classical randomness of the queries. However, this randomness is a useful resource also for QPQ because Alice can increase her probability of catching a cheating Bob by choosing a high number of random queries in her superposition.

The user security of the protocol rests on two key features, namely, the fact that Alice is sending her queries in random order, and the fact that she is sending them one by one. The first feature prevents Bob from knowing which kind of query (superposed or plain) he is receiving at each time: otherwise he would just let the superposed queries through, and measure the plain ones, finding out j and evading detection. The second feature prevents Bob from employing joint measurements on the queries, which would allow him to find out the value of j because the subspaces spanned by the joint states of Alice's queries are orthogonal for different choices of j.

To discuss the user security of the protocol it is worth starting from a simple strategy that Bob could try to use cheat on Alice in the first embodiment of the QPQ protocol (i.e. the one in which Alice adopts equally weighted superpositions that involves the rhetoric query 0). Suppose, for instance, that Bob performs projective measurements on both of Alice's queries. By doing so he will always recover the value of j. Moreover with probability ½, one of his two measurement results will return 0 in correspondence to Alice's superposed query. In this case, Bob's attempt at cheating is successful, as he can correctly re-prepare both of Alice's queries. However, with probability ½, Bob gets j from both measurements, and it will be impossible for him to determine the order of Alice's queries. In this case, no strategy of his has more than ½ probability of passing Alice's test. In fact, this is the probability that a state of the form $|j\rangle_Q |A_j\rangle_R$ passes the test of being of the form $(|j\rangle_Q |A_j\rangle_R + |0\rangle_Q |A_0\rangle_R)/\sqrt{2}$.

If Bob uses this cheating strategy, Alice can find it out with probability ¼ (this number can be easily increased using the modified QPQ protocols discussed above).

What if Bob employs a more sophisticated cheating strategy? Bob is presented randomly with one among two possible scenarios (A or B) depending on which state Alice sends first. These scenarios refer to the following joint states of her query:

$$|S_A\rangle = \frac{|j\rangle_{Q_1}(|j\rangle_{Q_2}+|0\rangle_{Q_2})/\sqrt{2} \text{ and } |S_B\rangle = (|j\rangle_{Q_1}+|0\rangle_{Q_1})|j\rangle_{Q_2}/\sqrt{2}} \quad (9)$$

where $Q_1$ and $Q_2$ are her first and second query. The failure of the above cheating strategy stems from Bob's impossibility to determine which scenario Alice is using. This is a common problem to all cheating strategies. It is related to the non-orthogonality of the states $|S_A\rangle$ and $|S_B\rangle$, and to the limit posed by the timing of the protocol (to gain access to $Q_2$, Bob must first respond to $Q_1$).

Working along these lines, it can be shown that Alice has a nonzero probability of discovering that Bob is cheating, whatever sophisticated methods he employs. More precisely, we follow a derivation which is similar to that performed in M. Christandl and A. Winter, *IEEE Transactions on Information Theory*, 51:3159, 2005. It can be shown that his impossibility of performing joint measurements on $Q_1$ and $Q_2$ places a bound on the information Bob obtains on j. Alice can enforce the privacy of her queries by requiring that Bob is never caught cheating.

More particularly, any action by Bob in response to Alice's two queries can be described in terms of two unitary transformations $U_1$ and $U_2$. The transformation $U_1$ acts on the registers $Q_1$, $R_1$ and on an ancillary system B which is under Bob's control (this also includes his database). The transformation $U_2$ acts on $Q_2$, $R_2$ and B. If Bob is not cheating, $U_1$ and $U_2$ are instances of the qRAM algorithm of Equation (15) below and they coherently copy the information from the database to the R registers leaving the ancilla B in its initial state. If instead Bob is cheating, at the end of the communication the system B will be correlated with the rest. In this case Alice's final state is the mixture:

$$\rho_\ell = Tr_B[U_2 U_1 |\Psi_\ell(j)\rangle\langle\Psi_\ell(j)| U_1^+ U_2^+] \qquad (10)$$

where the label $\ell$=A, B refers to the scenario used by Alice to submit her query j, and where $|\Psi\ell(j)\rangle = |S\ell\rangle_{Q_1Q_2}|0\rangle_{RB}$ is the corresponding input state ($|0\rangle_{RB}$ being the initial state of the registers $R_{1,2}$ and of the ancilla B). The probability $1-P\ell(j)$ that the state $\rho\ell(j)$ supplied by Bob will pass Alice's test can be easily computed by considering its overlap with the states corresponding to the answer that a non-cheating Bob would provide. On Bob's side, the information $I_B$ that he retains on the query is stored in the final state of the ancilla B, i.e.

$$\sigma\ell(j) = Tr_{Q_1Q_2R_1R_2}[U_2U_1|\Psi\ell(j)\rangle\langle\Psi\ell(j)|U_1^+U_2^+]. \qquad (11)$$

An information-disturbance trade-off (see M. A. Nielsen and I. L. Chuang, *Quantum Computation and Quantum Information*, Cambridge University Press, Cambridge, 2000) can be obtained by noticing that if $1-P\ell(j)\approx 1$, then $\sigma_\ell(j)$ must be independent from j. Specifically, requiring $P\ell(j)\leq \epsilon$ for all $\ell$ and j, one can show that $1-F(\sigma\ell(j), \sigma^*)\leq O(\epsilon^{1/4})$, where $\sigma^*$ is fixed state and F the fidelity (A. Uhlmann. Rep. Math. Phys., 9:273, 1976).

Therefore, in the limit of $P\ell(j)\rightarrow 0$ (that is, Bob passes the test with high probability), the states he retains are independent from the label j that identifies Alice's query. This can also transformed into an upper bound on the mutual information $I_B$ by evaluating the Holevo information (A. S. Holevo, *Probabilistic and statistical aspects of quantum theory*, North Holland, Amsterdam, 1982) associated to the ensemble $\{p_j, \sigma(j)\}$ where $p_j=1/N$ is the probability that Alice will send the j-th query, and where $\sigma(j)=[\sigma_A(j)+\sigma_B(j)]/2$ is the final state of B (from Bob's point of view), since Alice randomly chooses among the scenarios A and B with probability ½. By doing so it can be shown that $I_B \leq O(\epsilon^{1/4} \log_2 N)$. Thus, Bob's information on Alice's query is upper bounded by the probability of getting caught.

An important caveat is connected to the assumption that there cannot be two different answers to one query. This must be kept in mind as it may introduce a possible cheating strategy by Bob in certain implementations of the protocol, even though such strategies are not viable in the cases we described, where the index j is the database record, and it univocally determines the record's content $A_j$. We will analyze here the first variant of the protocol. In this case, the cheating strategy involves Bob adding an ancilla B and performing the following transformation during the first of Alice's two queries:

$$|j\rangle_Q \rightarrow [|j\rangle_Q|A_j^{(+)}\rangle_R(|0\rangle_B+|j\rangle_B)+|j\rangle_Q|A_j^{(-)}\rangle_R(|0\rangle_B-|j\rangle_B)]/2 \qquad (12)$$

if the answer to the jth query admits the two answers $A_j^{(+)}$ and $A_j^{(-)}$, or $|j\rangle_Q \rightarrow |j\rangle_Q|A_j\rangle_R|0\rangle$ otherwise. During the second of Alice's queries Bob must then perform the following transformation:

$$|j\rangle_Q(|0\rangle_B \pm |j\rangle_B)/\sqrt{2} \rightarrow |j\rangle_Q|A_j^{(\pm)}\rangle_A(|0\rangle_B \pm |j\rangle_B)/\sqrt{2} \qquad (13)$$

or, if the answer to the jth query is unique, the transformation:

$$|j\rangle_Q|\psi\rangle_B \rightarrow |j\rangle_Q|A_j\rangle_A|\psi\rangle_B \qquad (14)$$

for any state $|\psi\rangle_B$ of his ancilla. It can be easily shown that Alice cannot find out that Bob has performed this transformation. Moreover, in the case in which the answer to the jth query is not unique, she still sees either $A_j^{(+)}$ or $A_j^{(-)}$ (with ½ probability) as answers to both her queries. However, in this case Bob has retained a record of what was asked, as he is left with the states $|0\rangle_B+|j\rangle_B$ or $|0\rangle_B-|j\rangle_B$ (depending on whether Alice found $A_j^{(+)}$ or $A_j^{(-)}$). From either of these two states he has a probability of ½ to find out the value of j undetected. It is, therefore, important to utilize the QPQ protocol in situations where this cheating strategy is impossible, that is, when the query j univocally determines Bob's answer $A_j$.

Figure 3:
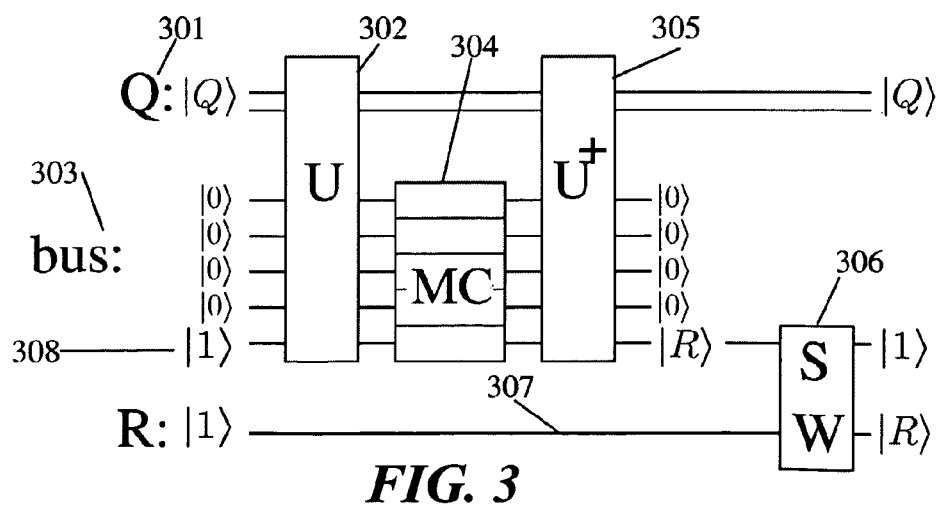
FIG. 3 is a block schematic diagram of a qRAM protocol to address an array of $N=2^n$ memory cells 304 containing k bits (or qubits) each.

For Bob to perform his part in the protocol, he must possess a quantum random access memory (qRAM) implementation (107 and 207 in FIGS. 1 and 2, respectively), in order to interrogate his database while preserving coherence (as shown in V. Giovannetti, S. Lloyd, and L. Maccone, *Physical Review Letters*, 100:160501, 2008; M. A. Nielsen and I. L. Chuang, *Quantum Computation and Quantum Information*. Cambridge University Press, Cambridge, 2000). As shown in FIG. 3, the aim of the qRAM protocol is to read, in a memory array, a location specified by an index register Q 301, and return the contents in a second register A 307. The register Q may contain a quantum superposition of location addresses. The content of the n-qubit address-register Q is correlated by a unitary transformation U 302 to the spatial position of a single qubit, which acts as a data bus. This means that the binary encoding in the quantum register is translated into a unary encoding on the location of the bus qubit 303, which is thus into one of $2^n$ possible locations (or in more than one location in quantum superposition). Now the qubit locally interacts with the memory cell array, and the addressing procedure is reversed by running the binary-to-unary encoding U protocol backwards (an "uncomputation" performed by $U^+$ 305). This decorrelates the position of the bus qubit from the Q register (otherwise quantum coherence would be destroyed). Its internal state contains the value of the memory cell (cells) that was to be read. Essentially, the qRAM algorithm implements the transformation:

$$\Sigma_j \alpha_j |j\rangle_Q \rightarrow \Sigma_j \alpha_j |j\rangle_Q |A_j\rangle_R \qquad (15)$$

where $A_j$ is the content of the jth memory location, and $\alpha_j$ are arbitrary amplitudes. Conventional architectures are described in M. A. Nielsen and I. L. Chuang, *Quantum Computation and Quantum Information*, Cambridge University Press, Cambridge, 2000) to O(n). qRAM designs exist in which the number of quantum logic operations to perform a call can be reduced from $O(2^n)$ of conventional qRAM designs. See for example V. Giovannetti, S. Lloyd, and L. Maccone, *Physical Review Letters*, 100:160501, 2008). Constructing a qRAM for quantum private queries should be significantly easier than constructing a large-scale quantum computer.

Because the qRAM described above can be complex to implement in certain situations, a third embodiment employs the protocol underlying any of the two previously described embodiments, but does not need a qRAM. The drawback is that the communication cost is exponentially higher than what can be achieved if a qRAM is present. In this embodiment, since Bob does not possess a qRAM, Alice prepares the superpositions of different spatial modes that are necessary to interrogate the database. This, of course, implies that the channel connecting Alice and Bob must sustain $N=2^n$ modes. The protocol proceeds exactly as discussed above (in any one of the two previous variants). However, the encoding of information and the database interrogation must follow a different strategy.

Figure 4:
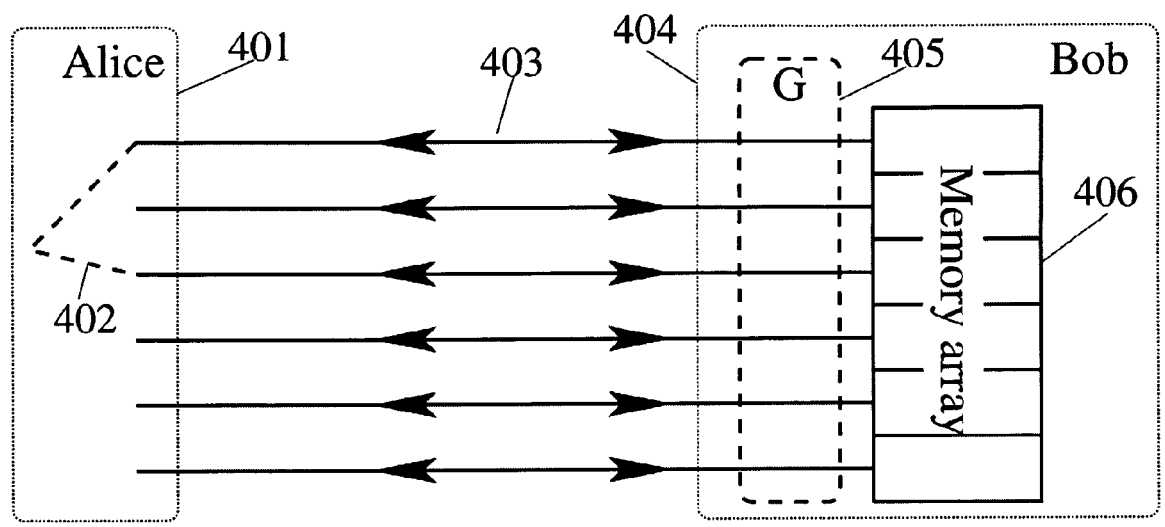
FIG. 4 is a block schematic diagram of a multimode-encoding implementation of the protocol which does not use the qRAM portion of the protocol.

FIG. 4 illustrates the protocol. Each of the possible queries is connected to a different mode 403 of an electromagnetic field. Alice 401 prepares her query by populating a selected mode. This can be done by inserting a single photon (or any analogous information carrier) in the selected mode. As described above, she also needs to perform superpositions of queries. In this case, she prepares a quantum superposition 402 of the photon populating different modes. The photon travels to Bob 404, who performs the global photon number measurement G 405. It returns the total number of photons in the N modes, without revealing which modes are populated. If the measurement tells him that there is more than one photon, he knows that Alice is trying to breach the data privacy: she is allowed a single query (or superposition of queries) at each time. In this case, Bob refuses to serve her by bouncing the signal back to her, without interrogating his database. Alice can still verify that Bob has not read her query, but, as she had cheated, she does not receive any answer to her query. Alternatively, if Bob's G measurement tells him that there is a single photon in the N modes, he will let such photon interact with his database stored in the memory array 406. The content of the memory cells are coherently copied into some internal degree of freedom of the information carrier (for example, the photon's polarization). He then reflects the photon back to Alice, who can conclude her protocol, in the manner described previously.

Notice that, if data privacy is not an issue, Bob's global measurement G 405 may be removed. In this case, Alice may recover the whole database, since Alice and Bob are connected by a channel that can sustain $N=2^n$ information carriers at a There are a variety of different techniques that can be used to implement the modes that connect Alice and Bob. For example, they can use different spatial modes of the electromagnetic field or different time-bins in a single spatial mode. In the latter case, the database is encoded into a time-dependent single memory cell.

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. A method for querying a database implemented with a quantum random access memory, the method ensuring complete data privacy and allowing a user to determine whether the database provider has been trying to obtain information about a query and comprising:
   (a) preparing by the user a first register containing a desired query and a second register containing the quantum superposition of the desired query with another query;
   (b) selecting at random one of the first and second registers and presenting the selected register to the database provider;
   (c) receiving a first response to the register selected in step (b) and sending the register not selected in step (b) to the database provider;
   (d) receiving a second response to the register sent in step (c);
   (e) measuring the response to the register containing the desired query to obtain an answer to the query; and
   (f) measuring the response to the register containing the superposition to determine whether the database provider has been trying to obtain information about the desired query.

2. The method of claim 1 wherein the other query is a fixed reference query.

3. The method of claim 1 wherein the other query is a random query.

4. The method of claim 1 wherein the quantum superposition is a fixed superposition.

5. The method of claim 1 wherein the quantum superposition is an arbitrary superposition.

6. The method of claim 1 wherein step (f) comprises performing a two-valued Positive Operator Valued measurement on the response to the register containing the superposition and the answer to the query to determine whether the superposition state has been perturbed.

7. The method of claim 1 wherein step (a) comprises entangling the first register with an ancillary system kept by the user.

8. The method of claim 7 wherein step (f) comprises performing a joint Positive Operator Valued measurement on the response to the register containing the superposition, the answer to the query and the ancillary system to determine whether the superposition state has been perturbed.

9. A method for querying a database connected to a user by a channel having a plurality of modes, each of which is associated with a query on the database, the method allowing a user to determine whether the database provider has been trying to obtain information about a query and comprising:
   (a) transmitting a first query to the database by performing at random one of the actions consisting of populating a mode corresponding to a desired query with an information carrier and populating a plurality of modes corresponding to the desired query and another query with a quantum superposition of the information carrier;
   (b) receiving a first response to the first query and transmitting a second query to the database by performing the action not performed in step (a);
   (c) receiving a second response to the second query transmitted in step (b);
   (d) measuring the response to the desired query to obtain an answer to the query; and
   (e) measuring the response to the query corresponding to the superposition to determine whether the database provider has been trying to obtain information about the desired query.

10. The method of claim 9 wherein the database provider in response to receiving the query transmitted in step (a) performs a global information carrier measurement over the plurality of modes to determine the number of information carriers in the modes and disallows access to the database if the result of the global information carrier measurement is greater than one.

11. The method of claim 9 wherein the other query is a fixed reference query.

12. The method of claim 9 wherein the other query is a random query.

13. The method of claim 9 wherein the quantum superposition is a fixed superposition.

14. The method of claim 9 wherein the quantum superposition is an arbitrary superposition.

15. The method of claim 9 wherein step (e) comprises performing a two-valued Positive Operator Valued measurement on the response to the query containing the superposition and the answer to the query to determine whether the superposition state has been perturbed.

16. The method of claim 9 wherein step (a) comprises entangling the desired query with an ancillary system kept by the user.

17. The method of claim 16 wherein step (e) comprises performing a joint Positive Operator Valued measurement on the response to the query containing the superposition, the answer to the query and the ancillary system to determine whether the superposition state has been perturbed.

* * * * *